Dec. 13, 1966 F. L. POST 3,292,165
DATA TRANSMISSION MODE
Filed June 28, 1963

INVENTOR
FREDERICK L. POST
BY Carl C. Kling
ATTORNEY 3,292,165
Patented Dec. 13, 1966

3,292,165

DATA TRANSMISSION MODE

Frederick L. Post, Poughkeepsie, N.Y., assignor to International Business Machines Corporation, New York, N.Y., a corporation of New York Filed June 28, 1963, Ser. No. 291,517
9 Claims. (Cl. 340—174)

This application relates to transmission of digital information, and more particularly to a data transmission mode in which common-mode noise is minimized.

Various methods of minimizing noise in magnetic core and other memories, and in certain other data transmission devices, have been investigated. These include the use of a two core per bit arrangement in which one core does not store data but serves for noise cancellation only. The noise reduction advantages of the two core per bit arrangement, however, have not in general been sufficient to overcome the cost disadvantage of providing the second core for each bit.

It is the object of this invention to cancel noise in two element per bit fashion by using each data transmission element both for data and for cancellation with respect to another element.

A feature of the invention is the encoding of bit patterns for transmission to allow differential sense amplifiers to provide noise cancellation similar to that of the two core per bit arrangement, by using the outputs of two bit transmission elements as differential sense amplifier inputs.

Another feature of the invention is the direct utilization of the natural exclusive OR function of each sense amplifier to decode the bit value from the encoded values of a pair of bit transmission elements.

An advantage of the invention is the provision of noise cancellation similar to the two core per bit cancellation with the addition of only a single sense line for the entire multibit word, at a considerable saving in cost over two core per bit techniques.

The foregoing and other objects, features and advantages of the invention will be apparent from the following more particular description of a preferred embodiment of the invention as illustrated in the accompanying drawing.

*Summary of the invention*

The invention relates to an arrangement of bit transmission elements in a digital data transmission unit in which unit the word noise is minimized. The transmission unit may, for example, be a magnetic core or thin film memory. This minimization is accomplished by the addition of an auxiliary sense line, and an auxiliary bit for each word, and by deriving data values from pairs of bits read in exclusive OR fashion rather than directly. In effect, each bit of information is carried "between" two physical bit transmission elements. The bit is a zero if both elements are in the same state and is a one if the elements are in opposite states. If there are $n+1$ sense lines, each traversing a row of transmission elements, there are $n$ combinations of adjacent elements and $n$ combinations of adjacent sense lines to be used as inputs for the $n$ differential sense amplifiers. Each bit transmission element acts as a cancellation element for a related element.

Figure 1:
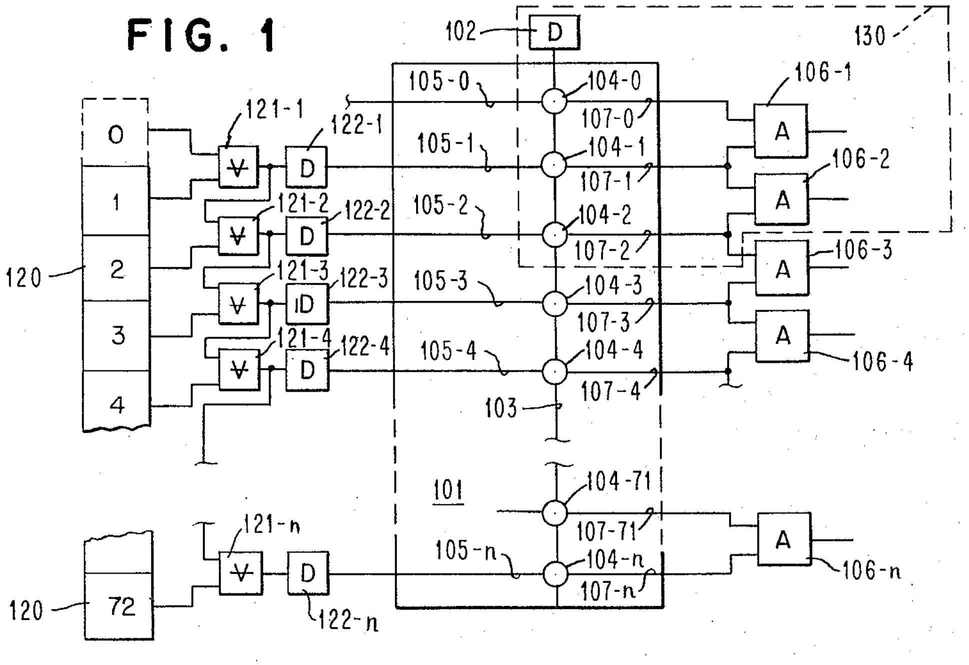
FIGURE 1 is a schematic electrical diagram of a data transmission device embodying the invention.

*FIGURE 1.—Data transmission device*

Array 101 is a reasonably standard array of elements which may be magnetic ferrite cores, magnetic films or some other binary data transmission device. The array may be subject to operation by the combination of an electrical excitation on a word line and another electrical excitation on a bit line. A selected word driver 102 provides its electrical excitation on word line 103 to bit storage elements 104–0 to **104–*n*. At a related time selected ones of bit lines 105–1 to 105–*n* is provided with electrical excitation to selected bit storage elements 104–1 to 104–*n*. This sets a data word into a group of bit storage elements which may later be read out. When read out occurs, a sense signal is provided to the appropriate sense amplifiers 106–1 to 106–*n* via the appropriate sense lines 107–0 to 107–*n***. The output of the sense amplifiers are then used in accordance with need.

In order to provide maximum bit storage capacity in minimum space and cost, it is necessary to provide bit storage elements of relatively small size and power output capacity. The relatively small outputs of the bit storage elements must be amplified considerably in order to be usable as data. Since the drive signal necessary to switch a bit storage element may be of an order to magnitude greater than the data output of the element, it is necessary for sense amplifiers to be suitably isolated from the drive signals and drive signal noise to prevent the drive signal from saturating the amplifier. A known technique of this sort is common mode noise rejection in which the drive signal or the drive signal noise is supplied to both sides of a differential sense amplifier to cancel itself out. Output signals, applied difference mode (unbalanced fashion) to the sense amplifier, are thus distinguishable from the accompanying common mode noise, even though the noise may be in the same or larger amplitude range as the output signals.

Because of the extremely small distances involved, the word noise from two adjacent bit storage elements on the same word line is very similar. Sense lines traversing two adjacent bit storage elements are basically capable of cancelling each other's word noise. This would happen, for example, if the two sense lines were used as inputs for a differential amplifier. However, if this is done, information would be lost because the signal becomes the difference of the signals from the two bit storage elements involved. The same output could mean either that two 1's cancelled or that two 0's cancelled. According to this invention, two adjacent bit storage elements on the word line are coupled to a particular sense amplifier; each element couples to two sense amplifiers.

For example, adjacent bit storage elements 104–1 and 104–2 couple via their respective sense lines 107–1 and 107–2 to sense amplifier 106–2. Similarly, bit storage elements 104–2 and 104–3 couple via bit lines 102–2 and 107–3 to sense amplifier 106–3. Information is not lost, however, because information is stored in these adjacent bit storage elements according to an exclusive OR function generated by the data encoder. Data for entry into the array is made generally available in storage register 120 which has a number of bit positions 120–1 to 120–10 equal to the number of bits in the word, and an auxiliary position 120–0. The auxiliary position is a permanent 0 value source and may be a simple connection to a reference potential. Each position of storage register 120 connects as input to a related exclusive OR logical block ⊻ 121–1 to **121–*n* which form the data codes. The other input to each ⊻ is the output of the previous ⊻, or in the case of ⊻ 121–1, the fixed 0 value of position 120–0 of the storage register. Storage register 120–2, for example, connects to ⊻ 121–2, the other input of which is the output of ⊻ 121–1. The data coder provides bit values for storage in the array, which, when recoded by the exclusive OR function inherent in sense amplifiers 106, connected to receive inputs from adjacent bits is returned to its original values. Drivers 122–1 through 122–*n* accept coded data from the respective ⊻'s 121–1 to 121–*n* to provide data entry on bit lines 105–1 to 105–*n* into a word of bit storage elements in the array 101. Upon readout, the word of bit storage elements of array 101 is conditioned by suitable excitations such as a full read current produced by driver 102 on word line 103 to provide data outputs on respective sense lines 107–0 to 107–*n*. These sense lines connect in pairs to sense amplifiers 106–1 to 106–*n***; the exclusive OR natural function of each sense amplifier thus provides a decoding for the bits stored in coded form in the bit storage elements of the selected word.

*Operation*

*Example.*—Assume that a word of data to be entered into the memory is presented via storage register 120. The composite of these values is coded by data coder 121 and made available to drivers 122. There is a ripple effect in data coder 121. The output of ⊻ 121–1 affects in turn the outputs of ⊻ 121–2, 121–3 . . . **121–*n* in the worst case; it is necessary to allow sufficient time for the ripple to occur. At a suitable timing interval thereafter, the selected drivers 121 are activated together with the selected word driver such as 102 to set bit values into a word of cores in the array. These bit values are not the same as the bit values presented by the storage register but a composite function developed by the rippling exclusive OR function of the encoder. At a suitable time thereafter, to read out the word of cores, suitable means such as driver 102 is activated to select the word of elements along word line 103 to provide outputs according to their data values. These outputs are impressed upon the respectively related sense lines 107–0 to 107–*n* and provided as inputs in pairs to differential sense amplifiers 106–1 to 106–*n***. These sense amplifiers perform their natural exclusive OR function and in so doing recode the bit values back to that value originally presented by the storage register. For example, the storage register, array and sense amplifier values for storage of a particular word might be as follows:

| Position | Storage Register 120 | Array 104 | Sense Amplifiers 106 |
|---|---|---|---|
| 0 | (0) | (0) | ---------- |
| 1 | 0 | 0 | 0 |
| 2 | 1 | 1 | 1 |
| 3 | 1 | 0 | 1 |
| 4 | 0 | 0 | 0 |
| 5 | 1 | 1 | 1 |
| 6 | 0 | 1 | 0 |
| 7 | 1 | 0 | 1 |

FIGURE 1 shows data coder 121 placed between storage register 120 and array 101. The data coder and storage register positions may be reversed so that the encoding takes place prior to arrival of data at the storage register. Data can also be stored in non-coded form by connecting storage register 120 directly to drivers 122 in which case sense amplifiers 106 perform an exclusive OR function on the actual data stored. This provides a coded composite function as the sense amplifier outputs. The data coder can be connected to the outputs of the sense amplifiers. Since in ordinary memories, the sense amplifier outputs are connected back to the storage register via a feedback loop for regeneration, this places the data coder prior to the storage register. Since output speed is normally more important than input speed, the data coder placement as shown in FIGURE 1 is preferred. If input speed should become more important than output speed, for example, in an asynchronous input type of data transmission device, it would be advantageous to position the data coder (ripple connected exclusive OR's) on the outputs of the sense amplifiers.

Figure 2:
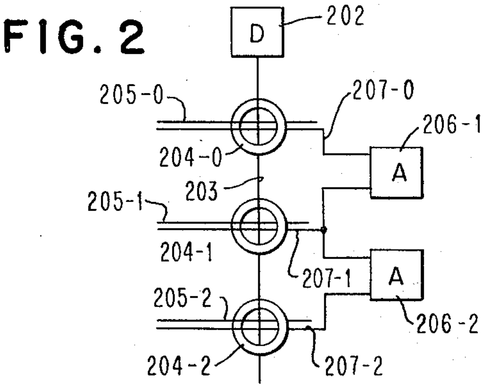
FIGURE 2 is a schematic diagram of a ferrite core embodiment of the invention.
Figure 3:
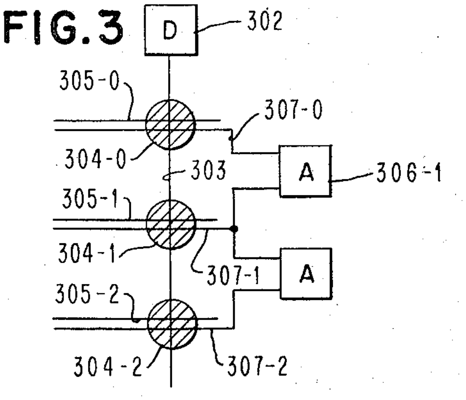
FIGURE 3 is a schematic diagram of a magnetic film embodiment of the invention.

FIGURES 2 and 3 show the invention in the context of a memory made up of ferrite toroids and of oriented magnetic films respectively. These figures encompass the area shown by dotted box 130 of FIGURE 1; each item has its counterpart item similarly numbered in FIGURE 1.

In FIGURE 2, driver 202 provides half read or half write current on word drive line 203. The other half read or half write current is provided on bit line 205–0 for toroid 204–0; on bit drive line 205–1 for toroid 204–1 and on bit drive line 205–2 for toroid 204–1 and on bit drive line 205–2 for toroid 204–2. Toroid 204–0 is the auxiliary core; it always holds a D. Sense lines 207–0 to 207–2 respectively traverse toroids 204–0 to 204–2. Sense windings 207–0 and 207–1 form the inputs to sense amplifier 206–1, sense windings 207–1 and 207–2 to sense amplifier 206–2. Upon readout, each differential sense amplifier 206 provides the exclusive OR of its applied array output signals.

In FIGURE 3, oriented magnetic films 304–0 to 304–2 are anisotropic films with their easy directions of remanence in a direction transverse to sense lines 307–0 to 307–2. The films are operated in the orthogonal mode by the combination of a relatively large drive pulse at right angles to the easy direction of magnetization together with a relatively small bit pulse developed in one or the other direction along the easy axis. Driver 302 provides a drive pulse on word drive winding 303 which is transverse to the easy axis. Simultaneously, bit pulses polarized according to 1 or 0 values are applied via bit lines 305–0 to 305–2. The vector sums of the transverse drive field and of the bit field rotates the magnetization of each bit film to a point nearer to the 1 or 0 direction according to the polarity of the applied bit field. The film magnetization drifts back to the easy axis in the 1 or 0 direction whenever the transverse field is removed. Readout is accomplished simply by a transverse field developed by driver 302 which provides a current pulse to word winding 303. As each film rotates toward the transverse, it provides an output signal related to its change of flux which is of a polarity according to the bit value stored in the film.

Figure 4:
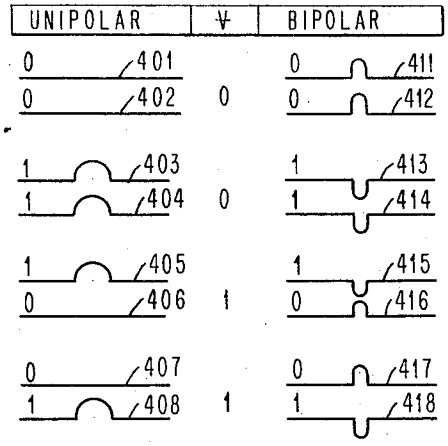
FIGURE 4 is a diagram of waveforms and their significance.

*FIGURE 4.—Output waveforms*

FIGURE 4 shows idealized output waveforms from the array. The sense amplifiers give the data result shown upon application of the various pairs of waveforms. A ferrite core as shown in FIGURE 2 provides essentially no output for the 0 and a plus output for the core. Outputs 00 as shown by waveforms 401 and 402, when applied across the differential sense amplifier, cancel and provide a 0 output. Similarly a 11 output as shown in waveforms 403 and 404 cancels and provides a 0 output. Unbalanced waveforms such as the 10 output waveform 405–406 provide an unbalanced input to the differential sense amplifier and result in a 1 output. The opposite unbalance condition 01 407–408 also provides a 1 output.

Magnetic films provide 1 and 0 outputs which are essentially identical except for polarity. Two 0 inputs to the differential sense amplifier are shown by waveforms 411 and 412 which cancel to provide the 0 output. Similarly, 11 sense signals 413–414 cancel to provide the 0 output. An unbalanced pair of sense signals such as 415–416 (10) or as 417–418 (01), since they are applied to opposite sides of the differential sense amplifier, provide an enhanced signal for the 1 output.

While the invention has been particularly shown and described with reference to preferred embodiments thereof, it will be understood by those skilled in the art that various changes in form and details may be made therein without departing from the spirit and scope of the invention.

What is claimed is:

1. Data transmission mechanism comprising:

(a) data presentation means for presenting a first group pattern of bit signals;

(b) array means, interconnected with said data presentation means, for transmitting any given group pattern of bit signals directly on a bit by bit basis without change of signal, subject however to the existence of common mode noise, said array means including auxiliary means having significance as an auxiliary signal, to be used for noise cancellation;

(c) array output means connected to said array means having an inherent coding function when connected to said array to receive signals and provide sense outputs but provide cancellation of noise; and (d) data coding means, interconnected with said data presentation means, arranged to code each pattern of bit signals during transmission complementary in effect to the coding function of said array output means;

(e) whereby each pattern of bit signals undergoes a change from the first group pattern to a coded second group pattern and back to said first group pattern during transmission.

2. Data transmission mechanism according to claim 1 wherein said data coding means is connected between said data presentation means and said array.

3. Data transmission mechanism according to claim 1 wherein said data coding means is connected to said array output means to receive sense outputs.

4. Data transmission mechanism according to claim 1 wherein said array output means has the exclusive OR function and said data coding means has a composite function being the exclusive OR of a reference signal and the first bit, exclusive OR of the first exclusive OR and a second bit, exclusive OR of the second exclusive OR and a third bit . . . and exclusive OR of the $(n-1)$th exclusive OR and the $n$th bit.

5. Data transmission mechanism comprising:

(a) signal presentation means for simultaneously presenting a pattern of bit signals;

(b) data transmission means connected to said signal presentation means, which data transmission means provides as its output a pattern of bit signals which is subject to common mode noise;

(c) differential coding output means connected to said data transmission means to receive pairs of bit signals differentially in such fashion that common mode noise in the two signals is cancelled and the bit signals are combined in exclusive OR fashion; and (d) data coding means associated with said signal presentation means, said data transmission means and said differential coding means to develop a composite function of the pattern of bit signals, the composite function being the exclusive OR of a reference signal and a first bit, exclusive OR of the first exclusive OR and a second bit, exclusive OR of the second exclusive OR and a third bit . . . and exclusive OR of the $(n-1)$th exclusive OR and the $n$th bit.

6. A magnetic memory system comprising:

(a) signal presentation means for simultaneously presenting a pattern of bit signals;

(b) data coding driver means associated with said signal presentation means to develop as memory bit drive signals a composite function of the pattern of bit signals, the composite function being the exclusive OR of a reference signal and the first bit, exclusive OR of the first exclusive OR and the second bit, exclusive OR of the second exclusive OR and the third bit . . . and exclusive OR of the $(n-1)$th exclusive OR and the $n$th bit;

(c) world select driver means;

(d) array means subject to said logical coding driver means and said word select driver means to store in a selected word location a pattern or bit values respectively associated with the values of individual bit signals of the composite function pattern of bit signals developed by said logical coding driver means; and (e) differential coding means connected to said array means to receive pairs of bit signals differentially in such fashion that common mode noise in the two signals is cancelled and the bit signals are combined in exclusive OR fashion.

7. A magnetic memory system according to claim 6 in which said array means is a matrix of oriented magnetic films, including data films and auxiliary films, said word select driver means is arranged to produce a relatively large magnetic field orthogonal to the easy direction of magnetic orientation of the films, said logical coding driver means is arranged to produce a relatively small bipolar field to set the film selectively to remanence conditions respresentative of binary values, whereby upon readout selection by said word select driver means said differential coding means is subjected to pairs of signals varying in polarity according to data, representative of an auxiliary film and related group of data films, which signals either add or cancel differentially.

8. A magnetic memory system according to claim 6 in which said array means is a matrix of ferrite toroids, including data toroids and auxiliary toroids, said word driver means and said logical coding driver means are arranged to write information selectively into the data toroids, and to read information selectively from a group of data toroids and a related auxiliary toroid.

whereby upon readout selection said differential coding means is subject to pairs of signals varying in amplitude according to data, representative of an auxiliary core and related group of data cores, which signals tend to cancel differentially.

9. A memory system comprising:

(a) storage register having positions numbered 1 to $n$ for $n$ bits of variable data and an auxiliary position 0 presenting a fixed reference signal representative of one basic bit value;

(b) a set of $n$ exclusive OR blocks, numbered 1 to $n$, connected each to receive two inputs, one from a similarly numbered position of said storage register and the other from the adjacent lower numbered one of said exclusive OR blocks, except for the first exclusive OR block 1 which receives its other input from the auxiliary position 0 of said storage register;

(c) a set of bit drivers, number 1 to $n$, connected to the outputs of similarly numbered exclusive OR blocks 1 to $n$;

(d) bit windings 1 to $n$ connected to similarly numbered ones of said bit drivers to provide bit excitations;

(e) word selection means for providing word selection excitations;

(f) storage array means arranged in matrix fashion with said bit windings and said word selection means to function as a memory said storage array including auxiliary means to provide a reference signal for noise cancellation purposes;

(g) sense winding means, number 0 to $n$, for the reference bit value and for bits 1, 2 . . . $n$;

(h) a set of $n$ sense amplifiers, numbered 1 to $n$;

(i) and means connecting said sense winding means in pairs to related sense amplifiers, each pair including the similarly numbered sense winding in its adjacent lower numbered sense winding.

References Cited by the Examiner

UNITED STATES PATENTS

| | | | |
|---|---|---|---|
| 2,911,631 | 11/1959 | Warren | 340—174 |
| 3,003,139 | 10/1961 | Perkins | 340—174 |
| 3,112,470 | 11/1963 | Barrett et al. | 340—174 |
| 3,191,163 | 6/1965 | Crawford | 340—174 |
| 3,193,809 | 7/1965 | Ullman | 340—174 |
| 3,208,054 | 8/1965 | Kaiser et al. | 340—174 |

BERNARD KONICK, *Primary Examiner.*

G. LIEBERSTEIN, *Assistant Examiner.*